United States Patent
Johnston et al.

(10) Patent No.: US 10,684,935 B2
(45) Date of Patent: Jun. 16, 2020

(54) DERIVING THE SHORTEST STEPS TO REPRODUCE A DEVICE FAILURE CONDITION

(71) Applicant: Cisco Technology, Inc., San Jose, CA (US)

(72) Inventors: Jay Kemper Johnston, Raleigh, NC (US); Magnus Mortensen, Cary, NC (US); David C. White, Jr., St. Petersburg, FL (US); Michael James Robertson, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 15/923,334

(22) Filed: Mar. 16, 2018

(65) Prior Publication Data

US 2019/0286546 A1    Sep. 19, 2019

(51) Int. Cl.
  *G06F 11/00*   (2006.01)
  *G06F 11/36*   (2006.01)
  *G06N 3/08*    (2006.01)

(52) U.S. Cl.
  CPC ........ *G06F 11/3608* (2013.01); *G06F 11/006* (2013.01); *G06N 3/088* (2013.01); *G06F 2201/865* (2013.01)

(58) Field of Classification Search
  CPC ............... G06F 11/006; G06F 11/0709; G06F 11/0712; G06F 11/079; G06F 11/2257; G06F 11/2263; G06F 11/261; G06F 11/3608; G06F 2201/865; G06N 3/08; G06N 3/088; G06N 3/10; G06N 99/00
  See application file for complete search history.

(56) References Cited

U.S. PATENT DOCUMENTS

| | | | | |
|---|---|---|---|---|
| 5,671,334 | A * | 9/1997 | Lynne | G06N 3/08 706/23 |
| 5,963,902 | A * | 10/1999 | Wang | G06K 9/6226 704/240 |
| 7,389,279 | B2 * | 6/2008 | Ruml | G06N 5/003 706/45 |
| 9,497,215 | B2 | 11/2016 | Vasseur et al. | |
| 9,503,466 | B2 | 11/2016 | Vasseur et al. | |
| 10,282,248 | B1 * | 5/2019 | Gudka | G06F 11/0793 |

(Continued)

*Primary Examiner* — Marc Duncan
(74) *Attorney, Agent, or Firm* — Behmke Innovation Group LLC; James M. Behmke; Jonathon P. Western (57) ABSTRACT

In one embodiment, a server creates a reproduction environment of a particular condition of a particular device, the reproduction environment having a device under test (DUT) representative of the particular device, and also being seeded with features regarding the particular condition. The server generates a plurality of models for reaching a target state of the particular condition, each of the plurality of models having differing actions. According to the techniques herein, the server then iteratively refines a minimal model based on the actions of the plurality of models and whether those actions during testing of the DUT get closer to or further from the target state. In response to determining that the minimal model can no longer be further refined during the iterative refining, the server then stores the minimal model as a solution model indicating a given minimal set and order of actions required to reach the target state.

20 Claims, 7 Drawing Sheets

(56) References Cited

U.S. PATENT DOCUMENTS

| | | | |
|---|---|---|---|
| 2006/0136783 A1* | 6/2006 | Craske | G06F 11/2257 714/38.1 |
| 2009/0164184 A1* | 6/2009 | Vucurevich | G05B 13/024 703/6 |
| 2009/0327172 A1 | 12/2009 | Liu et al. | |
| 2013/0282638 A1* | 10/2013 | Baum | G06N 5/00 706/46 |
| 2015/0339572 A1* | 11/2015 | Achin | G06N 5/02 706/46 |
| 2016/0180253 A1* | 6/2016 | Lakshmanan | G06N 20/00 706/12 |
| 2016/0217371 A1* | 7/2016 | Leithiser | G06F 16/28 |
| 2017/0083643 A1 | 3/2017 | Seigel et al. | |
| 2017/0192880 A1 | 7/2017 | Ramakrishnan et al. | |
| 2018/0100894 A1* | 4/2018 | Venetsky | G01R 31/31836 |
| 2019/0079849 A1* | 3/2019 | Korn | G06Q 10/04 |
| 2019/0205792 A1* | 7/2019 | Huang | G06F 9/4881 |

* cited by examiner

DERIVING THE SHORTEST STEPS TO REPRODUCE A DEVICE FAILURE CONDITION

TECHNICAL FIELD

The present disclosure relates generally to computers, and, more particularly, to deriving the shortest steps to reproduce a device condition (e.g., a failure condition).

BACKGROUND

Outstanding unsolved product bugs are a major risk to computing companies, including computer networking companies, computer hardware companies, computer software companies, and any other type of company tasked with creating and maintaining computer devices that need to operate properly over time. For example, a large computer networking company may experience nearly two million technical assistance cases per year, and engineers may spend thousands of hours attempting to reproduce customer problems, often without success.

In general, spending thousands of man-hours on manually narrowing down the root cause of catastrophic bugs, very often with no success, is inefficient and impractical, and often fruitless. In addition, many severe problems can escape quality assurance testing, learning about them only when they affect customers in the field. Still further, being unable to reproduce rare problems (such as "one-time" crashes) can still be detrimental since those problems can continue to occur frequently across many different customer networks.

Though existing problem detection and crash decoding systems currently have the ability to detect that a device issue has occurred, such systems are unable to determine the root cause for the problem, and therefore are also unable to provide any solution to the problem. That is, without being able to pinpoint the reason behind the issues, current techniques cannot consistently and reliably reproduce the issues. Without knowing why device issues happen, it is difficult to determine a proper solution for the issues.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a server creates a reproduction environment of a particular condition of a particular device, the reproduction environment having a device under test (DUT) representative of the particular device, the reproduction environment also being seeded with features regarding the particular condition. The server may then generate a plurality of models for reaching a target state of the particular condition, each of the plurality of models having differing actions. According to the techniques herein, the server then iteratively refines a minimal model based on the actions of the plurality of models and whether those actions during testing of the DUT get closer to or further from the target state. In response to determining that the minimal model can no longer be further refined during the iterative refining, the server then stores the minimal model as a solution model indicating a given minimal set and order of actions required to reach the target state.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
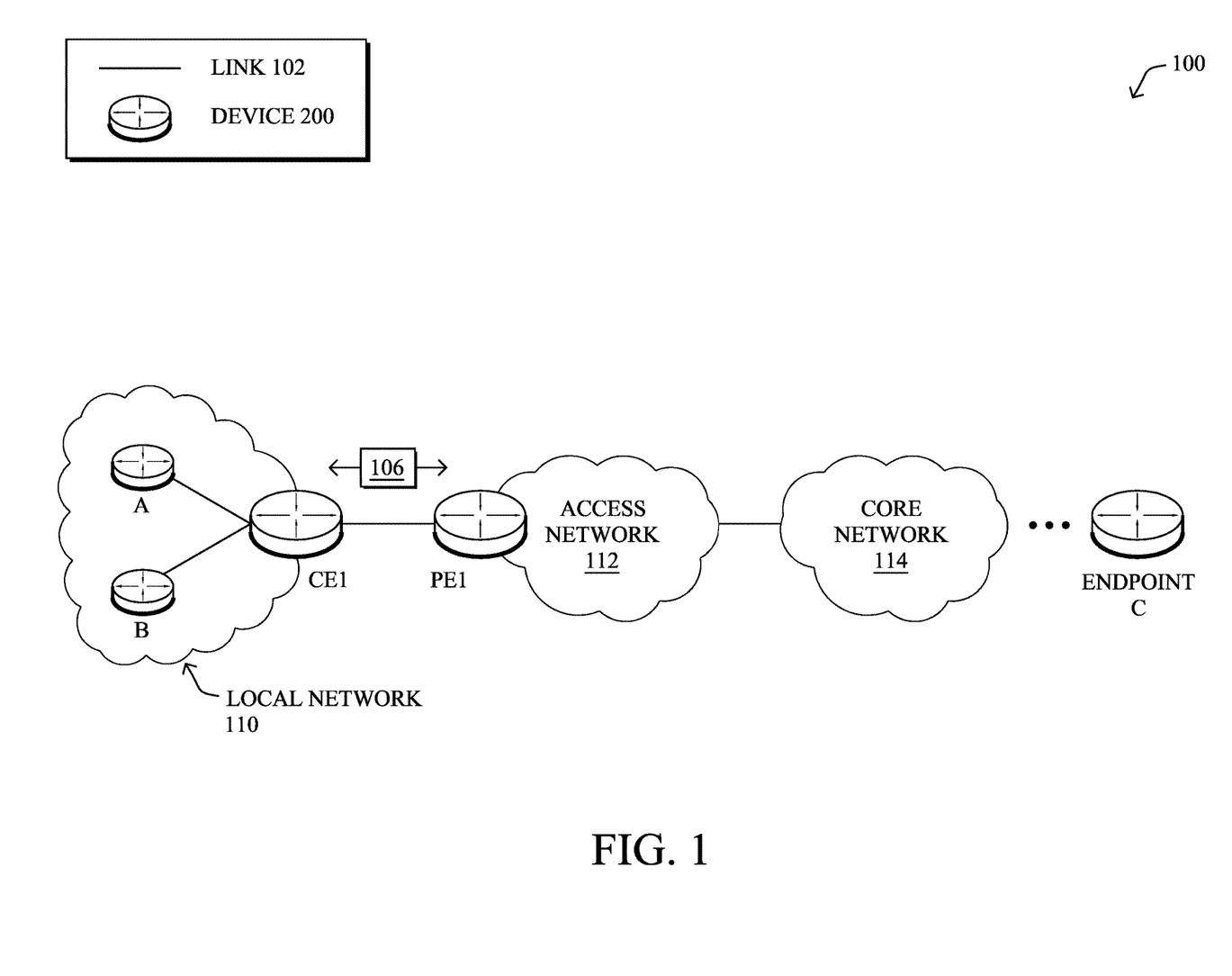
FIG. 1 illustrates an example computer network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B (e.g., computers or routers with computers connected to them) on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server or a router connected to a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of is communication network 100. In other words, communication network 100 may also include any number of intermediary networking devices such as, but not limited to, routers, switches, firewalls, etc., that are not shown.

Figure 2:
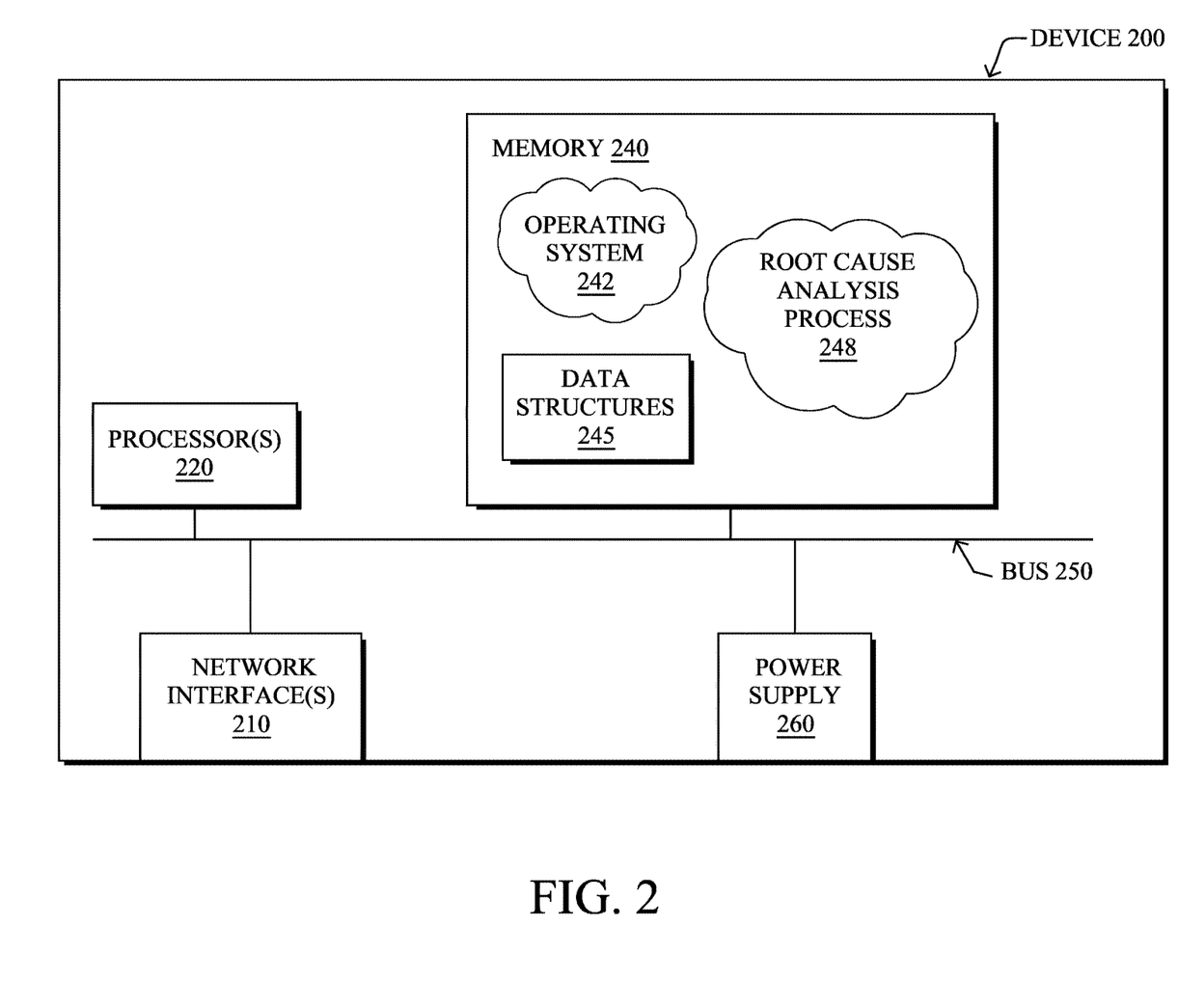
FIG. 2 illustrates an example device/node.

FIG. 2 is a schematic block diagram of an example node/device 200 that may be used with one or more embodiments described herein, e.g., as any of the computing devices shown in FIG. 1, or any other computing device referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical and/or wireless links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, among other things, invoking network operations in support of software processes and/or services executing on the device. These software processes and/or services may comprise a root cause analysis process 248, as described herein.

It will be apparent to those skilled in the art that other processor and memory types, including various computer-readable media, may be used to store and execute program instructions pertaining to the techniques described herein. Also, while the is description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, machine learning techniques may be utilized to perform some of the embodiments described herein. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior measurements, may make control decisions based on the effects of prior control commands, etc.

For purposes of the techniques described below, a learning machine may construct a model of computer behavior, using various steps and features to create an outcome condition. For example, a given model (e.g., a supervised, un-supervised, or semi-supervised model) may be used to generate and simulate various situations and conditions on a device (or device under test). Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), reinforcement learning, or the like.

Deriving the Shortest Steps to Reproduce a Device Condition

As noted above, outstanding unsolved product bugs are a major risk to computing companies, and spending thousands of man-hours on manually narrowing down the root cause of catastrophic bugs, very often with no success, is not only extremely inefficient and impractical, but it very often ends without success. As also noted above, many severe problems are only discovered when they affect customers in the field, and those problems can be difficult to reproduce (e.g., one-time crashes), even though they may be occurring in large numbers across many different customer systems. Having a technical assistance engineer trudging through millions of lines of code to find a problem is not an efficient (or even useful) response to a customer reporting a device in a failed state.

The techniques herein go beyond the current state of problem detection and crash decoding systems, which merely detect that a device issue has occurred, and instead can determine the root cause for the problem, pinpointing the reason behind the issues to consistently and reliably reproduce those issues. Once the root cause for an issue is known (i.e., the minimum number of steps to cause the issue), then a proper solution for the issue can be appropriately provided.

Said differently, the techniques herein use machine learning techniques to automatically recreate desired device conditions (e.g., particularly device problems, but also corrective conditions or other positive conditions), and narrow down the shortest steps required to generate the device condition (e.g., to reproduce the issue). That is, the techniques herein prepare a test environment to attempt to reproduce an unknown problem, and leverage an ensemble of machine learning techniques, combined with a library of actions to take against a system under test, to reproduce the target condition (e.g., failure state). Once the target condition has been reproduced successfully, reinforcement learning and unsupervised learning are used to determine the minimum steps required to reliably reproduce the problem.

Specifically, according to one or more embodiments of the disclosure as described in detail below, the techniques herein create a reproduction environment of a particular condition of a particular device, the reproduction environment having a device under test (DUT) representative of the particular device, the reproduction environment also being seeded with features regarding the particular condition. The techniques herein may then generate a plurality of models for reaching a target state of the particular condition, each of the plurality of models having differing actions. The techniques herein then iteratively refine a minimal model based on the actions of the plurality of models and whether those actions during testing of the DUT get closer to or further from the target state. In response to determining that the minimal model can no longer be further refined during the iterative refining, the techniques herein then store the minimal model as a solution model indicating a given minimal set and order of actions required to reach the target state.

Illustratively, the techniques described herein may be performed by hardware, software, and/or firmware, such as in accordance with the root cause analysis process 248, which may include computer executable instructions executed by the processor 220 (e.g., on a server) to perform functions relating to the techniques described herein, e.g., in conjunction with one or more other devices and/or processes.

Operationally, the techniques herein allow machines to automatically reproduce device conditions (e.g., problems) and then use reinforcement learning ensembles to determine the minimum number of steps required to reliably replicate them again. In particular, the techniques herein use machine learning to determine the minimum set of (and ordering of) specific actions that must be taken against a device under test (DUT) to reproduce a specific condition experienced in a production environment, whether it be a problem, a correction to a problem (e.g., how to "undo" an error condition), or a positive outcome (e.g., using the least memory or CPU utilization, etc.), and so on. As described below, this outcome may be obtained by chaining different machine learning algorithms together in an ensemble to introduce a self-learning reward system for the algorithm, while significantly improving the ability to automatically deduce minimum reproduction steps required to reproduce the desired outcome (e.g., unknown issues).

As described in further detail below, reinforcement learning may be used to implement the techniques herein. For instance, the cumulative reward of the algorithm may be increased as a specific feature on the device is measured to move towards the target state (which matches the described state that is being targeted, e.g., failure, correction, etc.). For example, when attempting to reproduce a memory leak, the reinforcement learning system will receive an increased reward as the memory usage increases as a result of the changes (actions) to the environment made by the system.

The actions taken in the environment against the device are selected from a library of available device configuration changes, data-plane traffic profiles, control-plane activity, etc., that are related to the target feature area of the device that experienced the problem, needs to be corrected, or other desired outcome.

The embodiments described in detail below may generally be considered to consist of three distinct phases of execution:

1. System Setup Phase: This phase prepares the environment for execution, where a "reproduction environment" is dynamically created and seeded with the information gathered from a particular device's diagnostic data (e.g., a failed device's captured information).
2. Reinforcement Learning Phase: This phase generates a series of models (algorithms, or a set of actions to take), each of them able to reproduce the condition (e.g., problem) possibly using a slightly different method. In this phase, as described below, reinforcement learning is used to guide the system to take a series of actions against the device under test to reach a "target state", where this process is repeated over and over to produce a number of different models (algorithms) that will reproduce the condition.
3. Model Iteration Using Unsupervised Learning Phase: This phase uses past successful models to generate a new model to try on the device under test that is better (faster) at reproducing the condition than the past models were. The different models which successfully reproduce the problem are analyzed and an optimal model is created that includes the minimum steps (and ordering of the steps, additional parameters, etc.) that are required to trigger the issue on the device.

Figure 3:
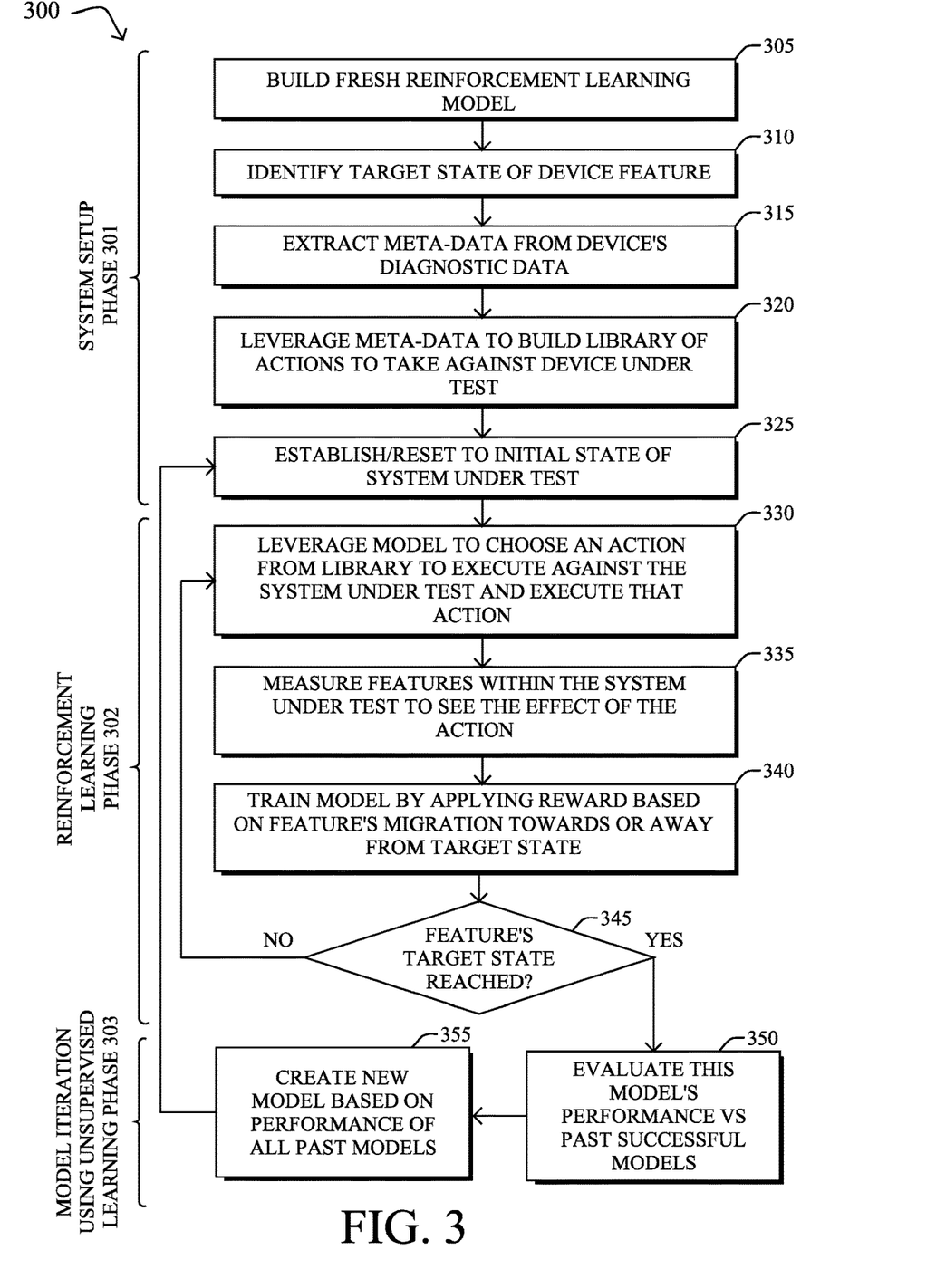
FIG. 3 illustrates an example of phases used to derive the shortest steps to reproduce a device condition.

FIG. 3 illustrates an example diagram 300 of the illustrative phases mentioned above, namely the system setup phase 301, the reinforcement learning phase 302, and the model iteration using unsupervised learning phase 303.

First, within the system setup phase 301, in response to a given trigger, such as a detected device failure, a reported failure, an administrator request, and so on, a new/fresh reinforcement learning model is built (305) and a target state of the device (e.g., a particular device feature) is identified (310). The reproduction environment may leverage virtual devices in a closed lab environment, or else may use physical devices as well. Also, examples of target states include such things as error states, memory utilization levels, central processing unit (CPU) utilization, or any other desired outcome state of a device. By extracting information (e.g., meta-data) from the device's diagnostic data (315), the information (e.g., meta-data) can be leveraged to build a library of actions to take against a device under test (DUT) (320). Accordingly, the initial state of the system under test can thus be established (325).

As noted, the techniques herein leverage the information obtained from a particular device (e.g., a diagnostic snapshot taken while a device was in a failed state) to automatically setup and configure a reproduction environment. The orchestration of the testbed creation may include steps such as:

The devices under test are loaded with the same operating system (OS) version as the device the target device version;

The configuration of the particular (e.g., failed) device is parsed, and sectionalized (based on features), sanitized (of passwords, etc.) and loaded on devices under test in the reproduction environment;

For failures, the specific feature that experienced the failure is analyzed, and details about the state of that failed feature are saved (this will be the target state of the reinforcement learning phase);

The device history, Syslogs, and other data sets may also be analyzed to determine what types of activities were occurring, and their order, on the device leading up to, and during, an incident; and Data sets may also be leveraged from flow information (connections/netflow/syslogs) to determine transient traffic flows (and traffic rates) through the device during the incident.

With the testbed prepared and the target state set, the reinforcement learning phase 302 can then start to attempt to reproduce the condition (target state) as described below. As an example, assume a router running an operating system version 19.2.2 experienced a system failure, and a diagnostic snapshot of the device was taken in the failed state. The system failure was caused by the device having 100% of the memory used up on the system, and the cause was a memory leak due to OSPF processing. In the Setup Phase, meta-data is learned about the device and the testbed is configured to match the real-world setup as closely as possible. The target state of the system is set to try and cause the OSPF process to leak memory and use 100% of the free memory available.

Referring now to the reinforcement learning phase 302, an initial model is created that determines what actions (changes) to make against the system under test (330). The model will initially choose actions that are in the same feature area as the feature that the system is targeting. For example, since the illustrative problem above is related to OSPF memory usage, the initial model chooses a list of different OSPF-related actions to take against the system under test (e.g., adding and removing configurations, exchanging messages with peers, bulk LSA updates, etc.).

According to the techniques herein a bank of actions may be taken against the reproduction devices under test in an effort to reproduce the specific targeted event. A running log of what actions are taken and with what parameters is kept for analysis by the system. Example actions taken against the device under test may include:

Feature Configuration Modification and Control-Plane activity: The reproduction devices start with the same, or functionally similar, configuration as the affected device, but for issues relating to feature modification (e.g., ACL changes), control session access (e.g., SSH), concurrency/race conditions, etc., the system starts making changes (based on predefined configuration blocks extracted from other devices tested) in an attempt to reproduce the issue.

Data-plane Network Traffic: Network traffic is crafted to match the device environment and passed through the data-plane of the devices under test. This is gathered from the data snapshots taken at the time of the issue (e.g., connection table information, netflow, syslogs, interface stats, etc.).

After each action is taken against the system, the environment is measured to determine if that action caused the system to move closer, or farther away from, the target state (335). If the action moved the system towards the target state, a token is given to the machine learning algorithm to represent a reward, then the algorithm mutates and adjusts the next action it takes against the system accordingly. It learns what actions, or combination of actions, or order of actions, or timing of actions, contribute the most to the increased tokens/score. That is, the system herein trains the model by applying a reward based on the action's/feature's migration towards or away from the target state (340). Specifically, in one embodiment, the machine learning algorithm continuously and repeatedly tries to reproduce the issue—and with each run records the resulting score. The higher the score, the better the chosen variables were. Variations of feature addition/removals, traffic flows, and control plane activity are adjusted if the issue is not immediately reproduced—or once it is reproduced in order for the algorithm to learn faster (and shorter) paths to reproduction. Actions may run in either a serial or parallel fashion. Executing multiple actions are run at once against an individual device greatly helps to reproduce problems introduced by software concurrency bugs. In addition, a plethora of devices under test are available for the ML algorithm to control and run concurrently. For example, the system herein may spin up 1,000 DUTs in the beginning as it is trying to begin to reproduce the issue, and then once it has at least one successful reproduction path, the effort focuses on refining and limiting the number of steps/actions necessary to reproduce the issue. In this phase the system may wind down some of the DUTs as they are no longer all needed.

Each action taken is a new feature in the execution path of the machine learning algorithm, and each feature is recorded and saved. Often, a feature can be modified or tuned, and for this the techniques may branch into leveraging an Elman Recurrent Neural Network, which is ideally suited for this purpose—to identify the various tuning parameters of the given features in a time series. This portion runs in the inner loop of the algorithm (from 345 back to 325). For example, the system in the illustration above may learn that OSPF memory seems to leak slowly when between 400 and 500 LSAs are exchanged with a neighbor running both OSPF and OSPFv3, and when that neighbor's OSPF peering relationship flaps every few minutes.

When the goal state is achieved (345), the model that was developed to reproduce the target state (e.g., the issue) is saved, and used in the next phase, i.e., the Model Iteration Using Unsupervised Learning phase 303.

According to the Model Iteration Using Unsupervised Learning phase 303, when a significant number of successful models are available, the unsupervised learning phase evaluates these models to find any patterns or similarities that seem to be contributing to the success of the different models. The phase predicts a new model that it predicts might possibly reproduce the same result, but faster. In particular, the results of the latest model are compared against all the other models that have run (350), and a new model is generated based on the performance of all past models (355). Once a threshold is reached where the models are no longer becoming more efficient at reproducing the condition (e.g., problem), the system considers the problem space exhausted and stops execution, presenting the minimal set of steps it has found to reproduce the issue. For example, as a result of the Unsupervised Learning Phase applied to the illustration above, the system may determine that in all of the successful models, OSPFv3 is configured, and around 500 LSAs are exchanged, and those are the only two common factors between the models. A new model is proposed that just configures OSPFv3 on the device and immediately generates 500 LSAs, and that model is designated to be attempted next against the system under test. That new model runs and triggers the problem. That model is then determined to be the most efficient way to reproduce the issue.

Figure 4A:
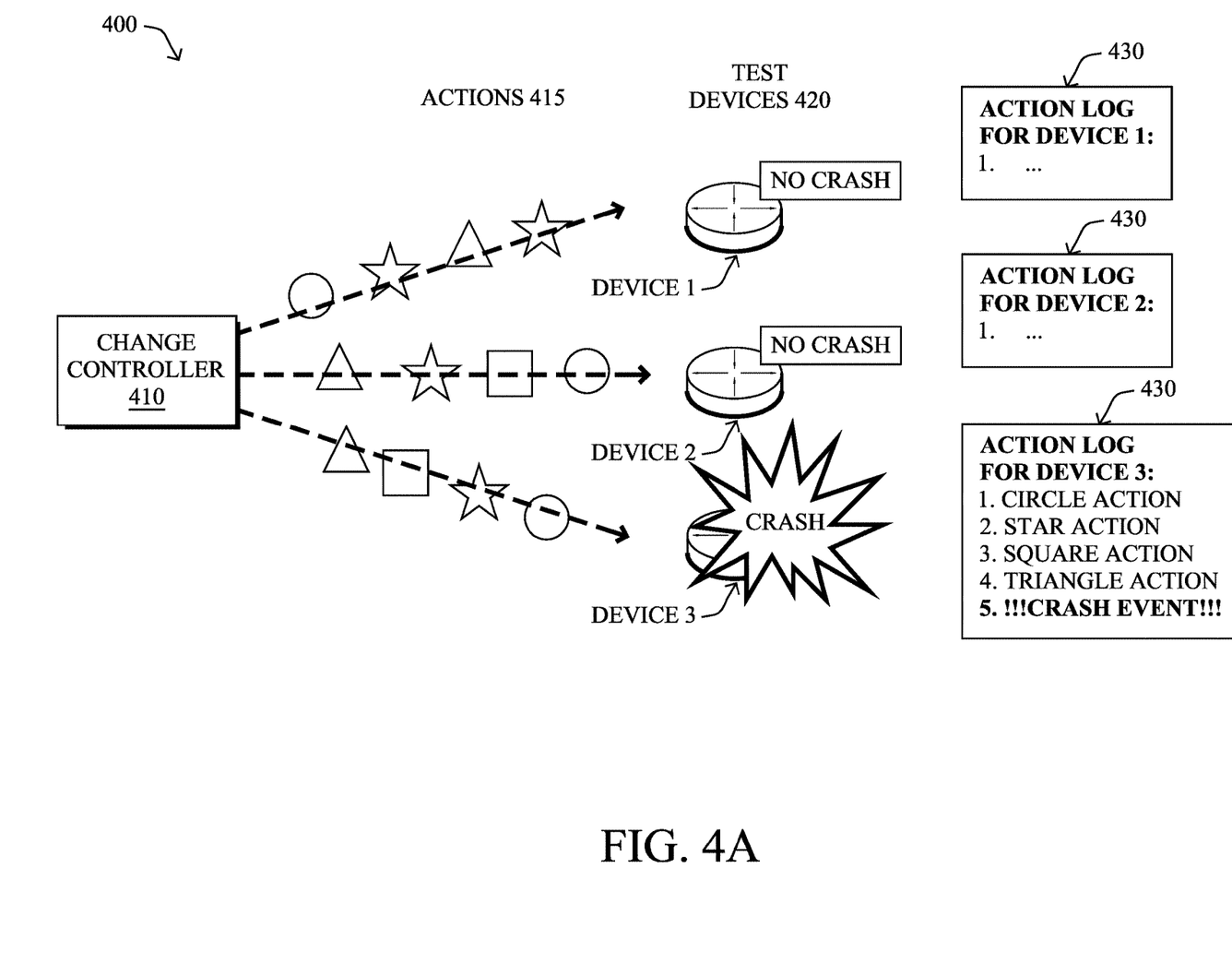
FIGS. 4A-4C illustrate an example of deriving the shortest steps to reproduce a device condition.
Figure 4B:
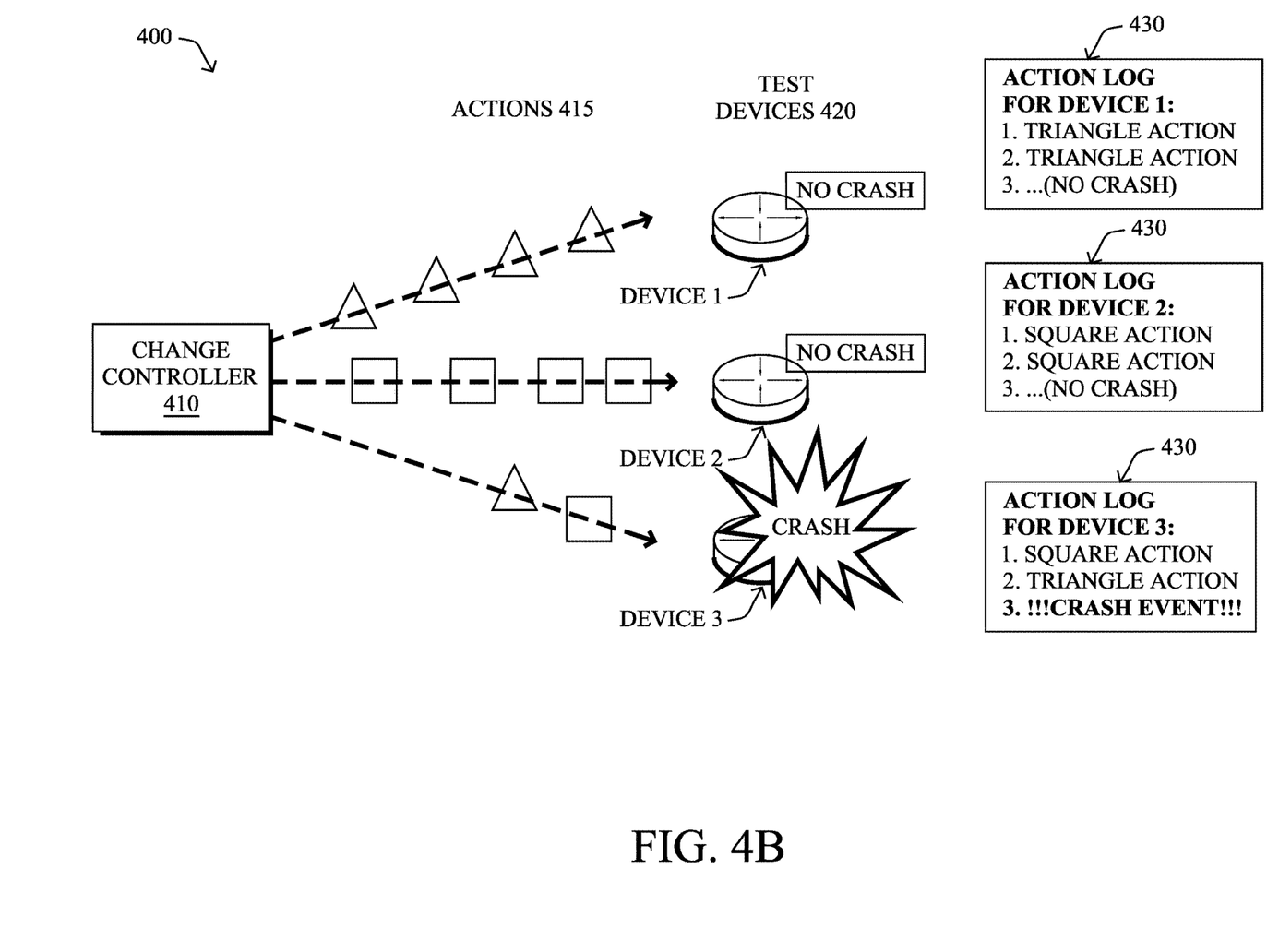
Figure 4C:
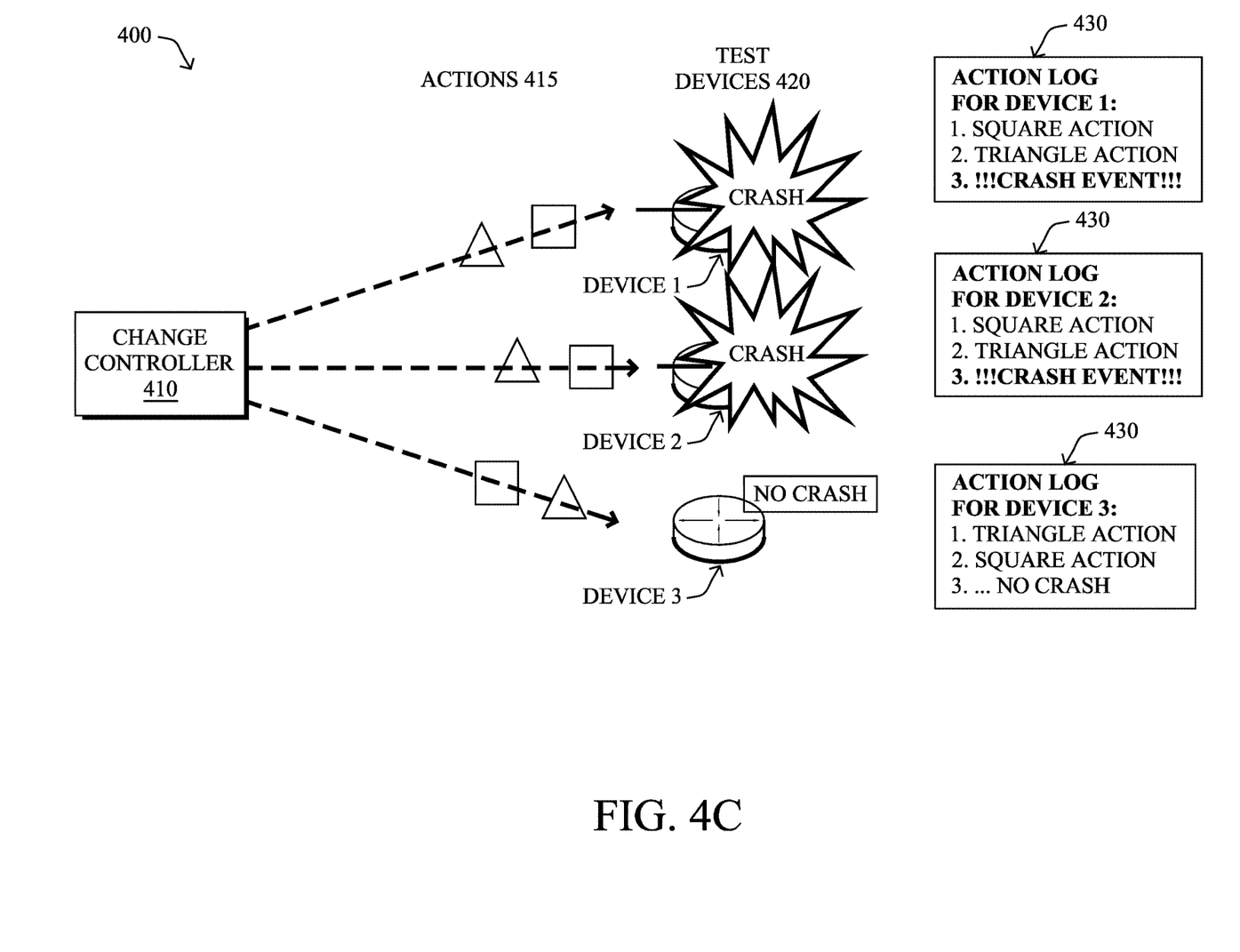

FIGS. 4A-4C further demonstrate various aspects of the embodiments herein. In particular, the environment 400 herein leverages a change controller 410 and one or more devices under test 420. The change controller 410 continually runs a series of actions 415 to a testbed of devices (e.g., adaptive security appliances or ASAs) to attempt to reproduce software crashes (bugs), then the controller zooms in on a particular crash it has reproduced and begins to reduce the set of steps that are required to reproduce the problem. (Note again that though this system illustrates crashes, the system may also target other problems such as memory leaks, process hangs, or any other measurable state, failure or otherwise.)

With specific reference to FIG. 4A, the simplified diagram shows the change controller 410 executing different actions 415 in different orders against test devices 420 in order to reproduce a crash event. An action log 430 is kept for each test device.

Reduction via reinforced learning may then take place as described above. For instance, the action log might have recorded hundreds or even thousands of different actions that were performed which led up to reproducing a particular problem. The system herein then leverages machine learning reinforced learning to determine the minimum set of steps required to reproduce the issue. Once narrowed in on the minimum set, the system again tests this minimum set of actions against the set of additional test devices to validate these minimum steps indeed reliably reproduce the issue.

An example reduction process that uses reinforcement learning may be configured to do the following:
1. Reset the device state;
2. Run actions against the device, keep a log of what actions were run, at what rate, which in parallel, etc.;
3. When the device crashes, save the action log that led up to the crash;
4. Analyze the action logs, search for similarities in the previous action logs that led to the same crash;
5. Prepare the next action list, considering what similarities are observed between successive runs that caused the issue; and
6. Return to Step 1.

Another aspect of the techniques herein is that during the reproduction process, the system also intentionally re-orders the actions to determine if the reproduction is order-significant. This is used both once the issue has been reproduced, and also in the case that the initial attempt cannot reproduce the issue—then reordering is introduced along with other entropy (e.g., expansion of features enabled/disabled, modifications of features, variation of traffic profiles, etc.).

As shown in FIG. 4B, the system has reduced the problem down to just a combination of the illustrative "triangle" and "circle" actions. It then tries different combinations of these actions to see which is the correct trigger. The system is able to reproduce the crash using just two actions, so it continues reducing the trigger from there.

As shown in FIG. 4C, the system has now reduced the problem as far as it can. In particular, the change controller 410 has been able to determine that the minimum steps to reproduce the bug are:
1. Execute the square action first; and
2. Then execute the triangle action.

Notably, in this example, the steps must be executed in that specific order.

With this information, an engineering team can reproduce and fix the bug faster, and services can more easily understand which customer deployments are at risk for the bug.

In one specific embodiment, the techniques herein may be adapted to perform device monitoring, such as where the solution model is distributed to real-world devices to watch for matching patterns, and those devices then trigger an alarm or mitigation action in response to either detecting the pattern or detecting behavior that is approaching the pattern. For instance, under the discovered assumption that a failure condition may result if certain actions are taken in a certain order, proactive monitoring can watch for the progression of actions that will lead to the failure condition. For example, if the problematic sequence is to perform actions A, B, C, D, and in that order, then an alarm can be raised if steps A, B, C are performed, possibly even preventing step D from occurring. Additionally, since each condition has its own solution model, presumably attempting to reach a desired state (e.g., step D), it may also be possible to determine corrective sets, which either recover from a failure (e.g., A, B, C, D failure, then E, F, G resolution), or else to circumvent the failure (e.g., A, B, E, F, D success). Other configurations and benefits from the techniques herein may also be established (e.g., dynamic and localized troubleshooting), and those mentioned herein are merely illustrative examples.

It is further important to note again that the desired end condition or end target state is definable, and may be a negative/failure condition (e.g., error, crash, delay, etc.), a corrective condition (e.g., recover from a failure, reduce memory utilization, cool processor temperature, etc.), a positive condition, or any administrator-defined condition.

Figure 5:
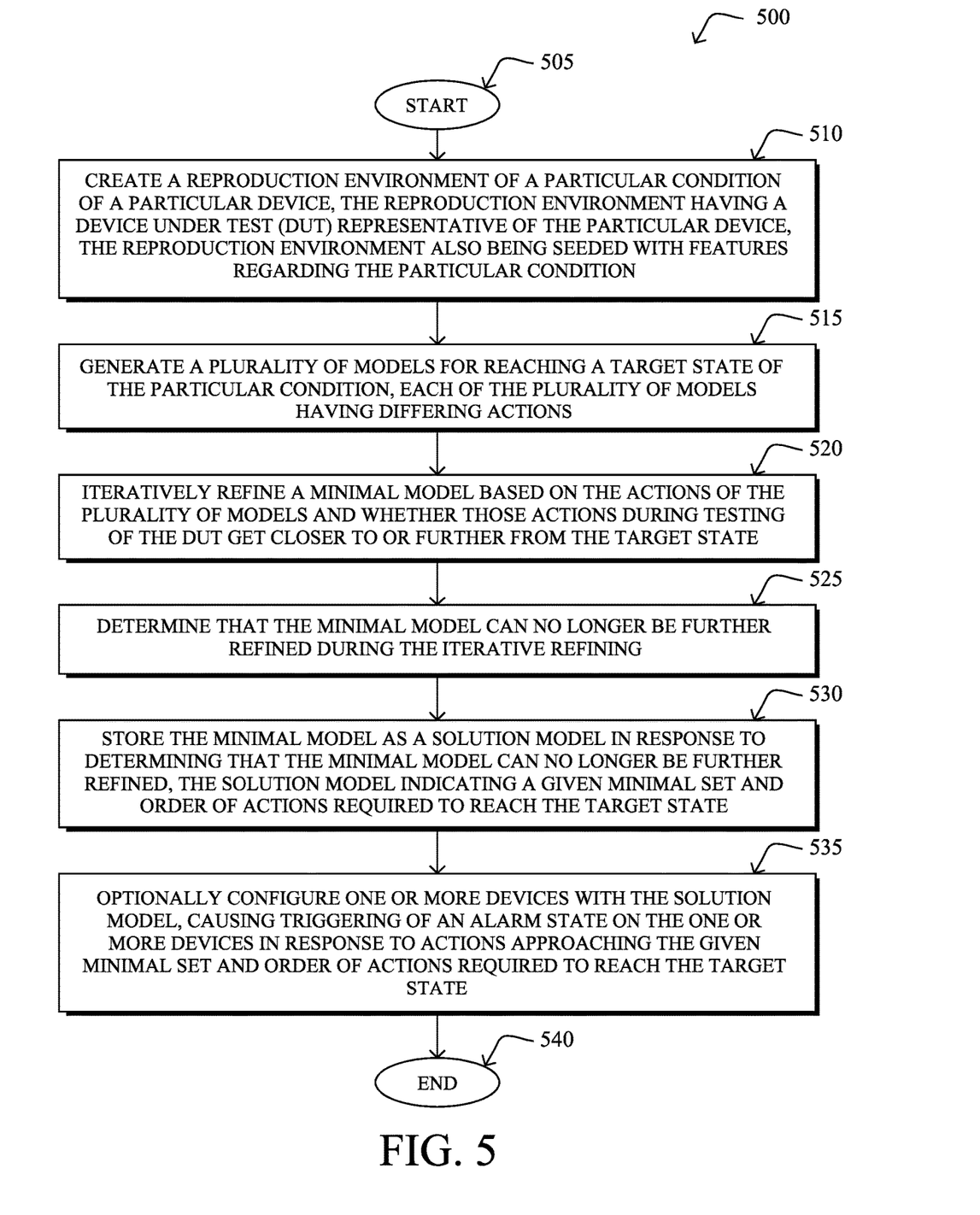
FIG. 5 illustrates an example simplified procedure for deriving the shortest steps to reproduce a device condition.

In closing, FIG. 5 illustrates an example simplified procedure for deriving the shortest steps to reproduce a device condition in accordance with one or more embodiments described herein. For example, a non-generic, specifically configured device (e.g., device 200, change controller 410, server generally, etc.) may perform procedure 500 by executing stored instructions (e.g., process 248). The procedure 500 may start at step 505, and continues to step 510, where, as described in greater detail above, the system herein creates a reproduction environment of a particular condition of a particular device, where the reproduction environment has one or more devices under test (DUTs) representative of the particular device, the reproduction environment also being seeded with features regarding the particular condition (e.g., a failure condition, a positive condition, a corrective condition, etc.). Features regarding the particular condition, in particular, may be such things as device diagnostic data, recorded actions of the particular device, a particular configuration of the particular device, and so on, as described above.

In step 515, the system herein generates a plurality of models for reaching a target state of the particular condition, each of the plurality of models having differing actions. For instance, target states need not be the ultimate condition (e.g., a failure), but may be any state (e.g., pre-failure or failure), such as an error condition, a crash condition, a failure condition, a delay condition, a particular memory utilization condition, a particular CPU utilization condition, a corrected condition, an administrator-defined condition, etc. The actions likewise may be any suitable action (e.g., step and feature taken by/on the device, such as setting a value, sending a message, receiving a command, etc.), such as, for example, configuration modification, control-plane activity, data-plane activity (e.g., network traffic on the device), physical conditions (e.g., temperature, fan operation, power levels, etc.), user input (e.g., command lines input, other processes being run, etc.), and so on. Notably, actions may be taken serially, in parallel, or both. As also described above, generating the models in step 515 may be based on applying reinforcement learning on actions taken on the DUT to try to reach the target state, where only those sets of actions that do reach the target state are included in the plurality of models.

In step 520, the system herein may then iteratively refine a minimal model based on the actions of the plurality of models and whether those actions during testing of the DUT get closer to or further from the target state. For instance, as described above, iteratively refining may comprise comparing a current iteration to previous iterations, and keeping the current iteration only when is more efficient that the previous iterations. Notably, one or more illustrative embodiments herein base the iterative refinements on unsupervised learning techniques. (Also note that generating the plurality of models may use a greater number of DUTs than iteratively refining the minimal model, as mentioned above).

Once it is determined in step 525 that the minimal model can no longer be further refined during the iterative refining (or else otherwise reaching some threshold state of refinement), then in step 530 the system stores the minimal model as a solution model, the solution model indicating a given minimal set and order of actions required to reach the target state. Optionally at this point, in step 535 the system herein may also configures one or more devices with the solution model, causing triggering of an alarm state on the one or more devices in response to actions approaching the given minimal set and order of actions required to reach the target state, as detailed above.

The illustrative and simplified procedure 500 may then end in step 540. It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, derive the shortest steps to reproduce a device condition. In particular, in certain embodiments, the techniques herein look for the minimum number of steps (root cause) to computer-related problems that are hard to replicate. In general, by using machine learning to iteratively attempt various combinations of actions (different steps, different features, different values, different lengths of time, etc.), while continually trying to reduce the actions taken to produce the target state (e.g., failure, correction, etc.), the techniques herein can provide greater insight into computer-related cause-and-effect than was ever before possible with mere manual problem-solving attempts.

Imagine, for example, the difference between a conventional statically built troubleshooting guide that essentially ends in "restart your device (and hope for the best)", versus a dynamic troubleshooting system according to the techniques herein that could process the entire situation and say, for example, "The root cause of your specific problem has been determined with 99% certainty, addressed on your system to prevent it from happening again, and reported to the software developer." The techniques herein thus offer a greater insight and confidence into determining the specific root cause for problems (i.e., the minimum set of actions required to consistently and reliably reproduce the issues), thus allowing for solutions to those problems to be determined, significantly improving efficiency of technical assistance systems and dramatically improving overall customer experience.

While there have been shown and described illustrative embodiments that provide for deriving the shortest steps to reproduce a device condition, it is to be understood that various other adaptations and modifications may be made within the spirit and scope of the embodiments herein. For example, while certain embodiments are described herein with respect to specifically addressing failure conditions, the techniques herein are not limited as such and may be used for other conditions, in other embodiments, such as corrective conditions, positive conditions, and so on. In addition, while certain devices and protocols are shown, such as computer networking devices and protocols, other suitable devices and protocols may be used herein, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    creating, by a server, a reproduction environment of a particular condition of a particular device, the reproduction environment having a device under test (DUT) representative of the particular device, the reproduction environment also being seeded with features regarding the particular condition;
    generating, by the server, a plurality of models for reaching a target state of the particular condition, each of the plurality of models having differing actions;
    iteratively refining, by the server, a minimal model based on the actions of the plurality of models and whether those actions during testing of the DUT get closer to or further from the target state;
    determining, by the server, that the minimal model can no longer be further refined during the iterative refining;
    storing, by the server, the minimal model as a solution model in response to determining that the minimal model can no longer be further refined, the solution model indicating a given minimal set and order of actions required to reach the target state; and
    configuring one or more devices with the solution model, causing triggering of an alarm state on the one or more devices in response to actions approaching the given minimal set and order of actions required to reach the target state.

2. The method as in claim 1, wherein the particular condition is selected from a group consisting of: a failure condition; a positive condition; and a corrective condition.

3. The method as in claim 1, wherein actions are selected from a group consisting of: configuration modification; control-plane activity; data-plane activity; physical conditions; and user input.

4. The method as in claim 1, wherein generating comprises:
    applying reinforcement learning on actions taken on the DUT to try to reach the target state, wherein sets of actions that do reach the target state are included in the plurality of models.

5. The method as in claim 1, wherein iteratively refining comprises:
    comparing a current iteration to previous iterations; and
    keeping the current iteration only when is more efficient that the previous iterations.

6. The method as in claim 1, wherein iteratively refining is based on unsupervised learning.

7. The method as in claim 1, wherein the reproduction environment comprises a plurality of DUTs representative of the particular device.

8. The method as in claim 7, wherein generating the plurality of models uses a greater number of DUTs than iteratively refining the minimal model.

9. The method as in claim 1, wherein the particular device is a computer networking device.

10. The method as in claim 1, wherein the features regarding the particular condition are based at least on one or more of device diagnostic data, recorded actions of the particular device, and a particular configuration of the particular device.

11. The method as in claim 1, wherein actions are taken serially, in parallel, or both.

12. The method as in claim 1, wherein the target state is selected from a group consisting of: an error condition; a crash condition; a failure condition; a delay condition; a particular memory utilization condition; a particular CPU utilization condition; a corrected condition; and an administrator-defined condition.

13. A tangible, non-transitory, computer-readable medium storing program instructions that cause a computer to execute a process comprising:
creating a reproduction environment of a particular condition of a particular device, the reproduction environment having a device under test (DUT) representative of the particular device, the reproduction environment also being seeded with features regarding the particular condition;
generating a plurality of models for reaching a target state of the particular condition, each of the plurality of models having differing actions;
iteratively refining a minimal model based on the actions of the plurality of models and whether those actions during testing of the DUT get closer to or further from the target state;
determining that the minimal model can no longer be further refined during the iterative refining;
storing the minimal model as a solution model in response to determining that the minimal model can no longer be further refined, the solution model indicating a given minimal set and order of actions required to reach the target state; and
configuring one or more devices with the solution model, causing triggering of an alarm state on the one or more devices in response to actions approaching the given minimal set and order of actions required to reach the target state.

14. The computer-readable medium as in claim 13, wherein the particular condition is selected from a group consisting of: a failure condition; a positive condition; and a corrective condition.

15. The computer-readable medium as in claim 13, wherein actions are selected from a group consisting of: configuration modification; control-plane activity; data-plane activity; physical conditions; and user input.

16. The computer-readable medium as in claim 13, wherein generating comprises:
applying reinforcement learning on actions taken on the DUT to try to reach the target state, wherein sets of actions that do reach the target state are included in the plurality of models.

17. The computer-readable medium as in claim 13, wherein iteratively refining comprises:
comparing a current iteration to previous iterations; and
keeping the current iteration only when is more efficient that the previous iterations.

18. An apparatus, comprising:
one or more network interfaces to communicate with a computer network;
a processor coupled to the network interfaces and configured to execute one or more process; and
a memory configured to store a process executable by the processor, the process when executed configured to:
create a reproduction environment of a particular condition of a particular device, the reproduction environment having a device under test (DUT) representative of the particular device, the reproduction environment also being seeded with features regarding the particular condition;
generate a plurality of models for reaching a target state of the particular condition, each of the plurality of models having differing actions;
iteratively refine a minimal model based on the actions of the plurality of models and whether those actions during testing of the DUT get closer to or further from the target state;
determine that the minimal model can no longer be further refined during the iterative refining;
store the minimal model as a solution model in response to determining that the minimal model can no longer be further refined, the solution model indicating a given minimal set and order of actions required to reach the target state; and
configure one or more devices with the solution model, causing triggering of an alarm state on the one or more devices in response to actions approaching the given minimal set and order of actions required to reach the target state.

19. The apparatus as in claim 18, wherein the particular condition is selected from a group consisting of: a failure condition; a positive condition; and a corrective condition.

20. The apparatus as in claim 18, wherein actions are selected from a group consisting of: configuration modification; control-plane activity; data-plane activity; physical conditions; and user input.

* * * * *

UNITED STATES PATENT AND TRADEMARK OFFICE
CERTIFICATE OF CORRECTION

| | |
|---|---|
| PATENT NO. | : 10,684,935 B2 |
| APPLICATION NO. | : 15/923334 |
| DATED | : June 16, 2020 |
| INVENTOR(S) | : Jay Kemper Johnston et al. |

Page 1 of 1

It is certified that error appears in the above-identified patent and that said Letters Patent is hereby corrected as shown below:

In the Specification

Column 3, Line 4, please amend as shown:
fied view of communication network 100. In other words, Column 3, Line 45, please amend as shown:
Also, while the description illustrates various processes, it Signed and Sealed this
Sixth Day of October, 2020

Andrei Iancu
*Director of the United States Patent and Trademark Office*